May 20, 1930.  U. W. HUTCHINGS  1,759,159
AUTO TIRE PROTECTOR
Filed May 25, 1928
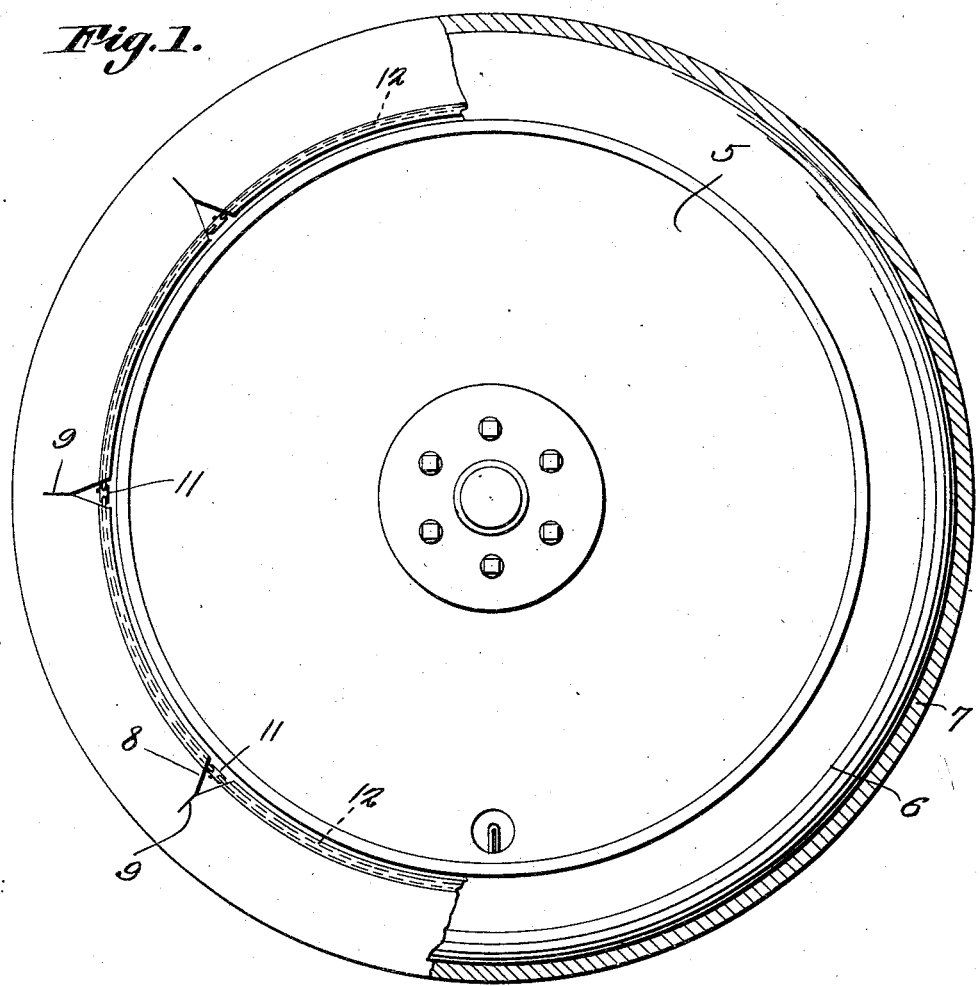
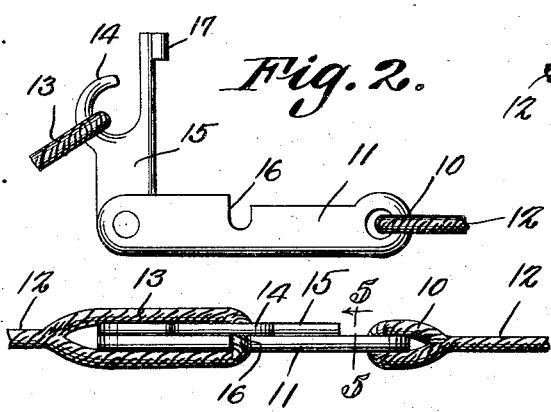
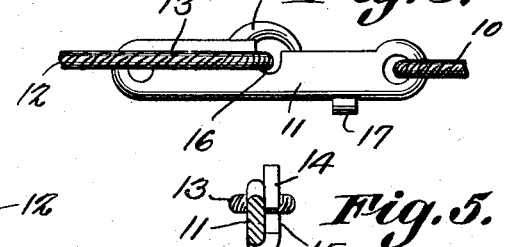
U. W. Hutchings
Inventor
By C. A. Snow & Co.
Attorneys Patented May 20, 1930

1,759,159

UNITED STATES PATENT OFFICE

URBAN WILLIAM HUTCHINGS, OF SAM FORDYCE, TEXAS

AUTO TIRE PROTECTOR

Application filed May 25, 1928. Serial No. 280,562.

This invention relates to an auxiliary tire casing or shoe to be used in connection with partially worn pneumatic tires, the primary object of the invention being to provide a casing constructed in such a way that it may be readily positioned over the usual tire casing.

An important object of the invention is to provide a protecting casing of this type which may be constructed of discarded partially worn casings which are not sufficiently strong to withstand pressure directed thereto by an inner tube but which may be used over worn tires to strengthen them.

A further object of the invention is to provide a fastener for fastening the protecting casing or shoe on the tire on which it is positioned.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view showing a protecting casing, constructed in accordance with the invention as positioned on a tire, a portion thereof being broken away.

Figure 2 is a side elevational view illustrating the fastener in its open position.

Figure 3 is a side elevational view showing the fastener in its closed position.

Figure 4 is a plan view of the fastener.

Figure 5 is a sectional view taken on line 5—5 of Figure 4.

Referring to the drawing in detail, the reference character 5 designates a wheel supplied with a pneumatic tire 6, with which the protecting casing, forming the subject matter of this invention, is used.

The protecting casing, which is constructed preferably of reconditioned discarded tire casing, is indicated by the reference character 7, and as shown has one of its edges formed with cut out portions 8, the cut out portions being disposed in predetermined spaced relation with each other, the same being substantially V-shaped, so that the side edge of the casing may be spread to permit it to be readily positioned over a tire, in a manner as shown by Figure 1 of the drawing.

Slits 9 are formed in the casing adjacent to the cut out portions, which slits permit of ready flexing of the portions of the protecting casing between the cut out portions 8. In each of the sections of the casing between the cut out portions 8, is a cable which is provided with an eye 10 at one end to permit a fastener, such as indicated at 11 to be secured thereto, the cable however being indicated by the reference character 12.

The opposite end of each cable is formed into a loop 13 adapted to accommodate the hook 14 formed on the lever 15 of the adjacent fastening member so that after the protecting casing has been properly positioned over a pneumatic tire, the fasteners may be secured in such a way as to draw the portions of the protecting casing, between the cut out portions 8 taut, and hold the protecting casing into close engagement with the pneumatic tire with which the device is used.

The fastener forming an important feature of the invention includes a main or body portion having a cut out portion 16 that provides a keeper for the loop 13 of the cable associated therewith, so that when the lever 15 of the fastener is moved downwardly to its closed position, the cable will be drawn taut and securely held in its taut position.

At one end of the lever 15 is a laterally disposed lug 17 adapted to move under the body portion of the fastener as shown by Figure 5, to hold the lever in its locked position.

From the foregoing it will be seen that due to the construction shown, the pull directed to the fastener will be between the keeper 16 and opposite end of the fastener, thereby relieving the lever 15 of undue strain.

It will further be noted that a casing such as shown by applicant may be positioned over a partially worn pneumatic tire to lengthen the life of a pneumatic tire.

I claim:

In a tire protector, a flexible cover constructed to conform to the shape of a tire, one of the sides of the cover having V shaped cut out portions extending inwardly from the edge thereof, cables secured to the cover and having their ends terminating adjacent to the V shaped cut out portions, and means for connecting the adjacent ends of the cables at points within the cut out portions.

In testimony that I claim the foregoing as my own, I have hereto affixed my signature.

URBAN WILLIAM HUTCHINGS.